F. O. YORK.
HAME FASTENER.
APPLICATION FILED JUNE 13, 1906.
927,627.
Patented July 13, 1909.
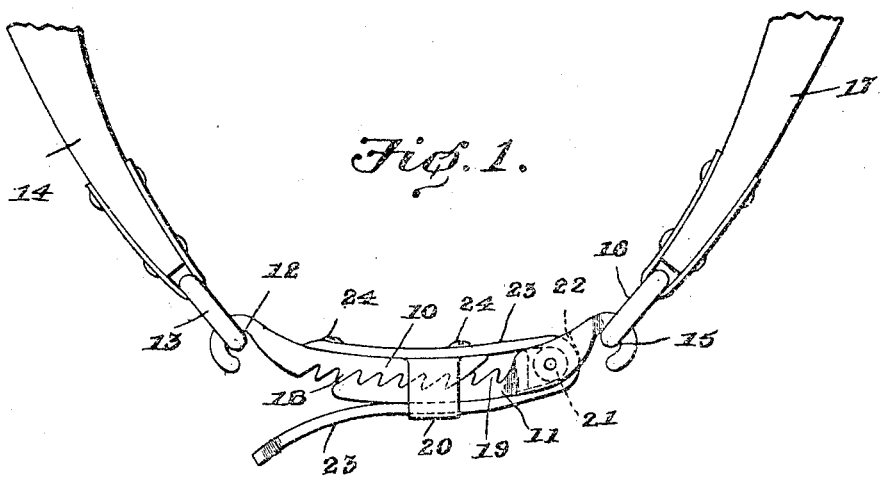
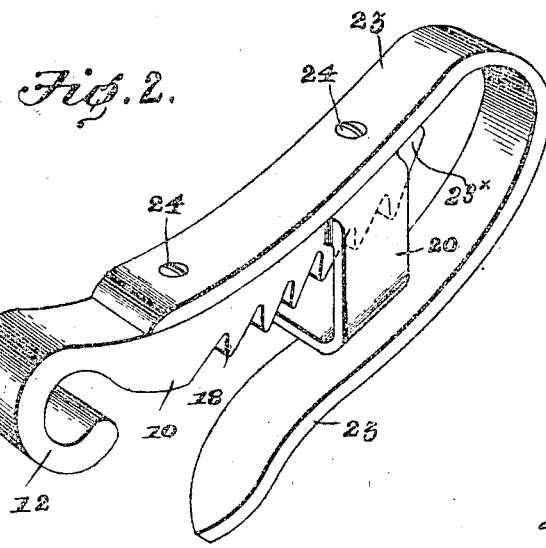
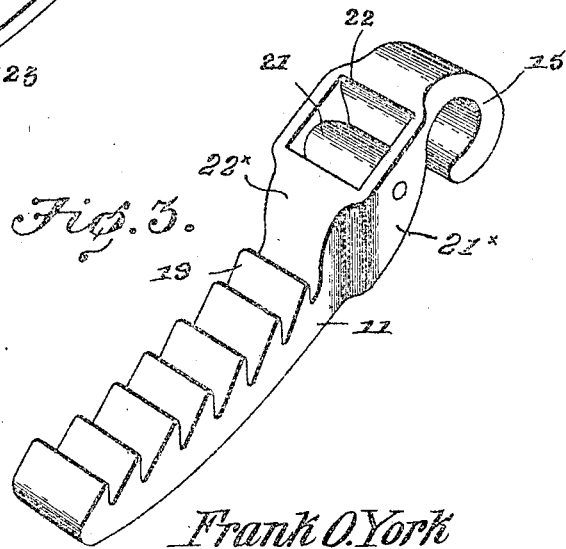
WITNESSES:
Frank O. York
INVENTOR
By
ATTORNEYS

UNITED STATES PATENT OFFICE.

FRANK O. YORK, OF LOCK HAVEN, PENNSYLVANIA.

HAME-FASTENER.

No. 927,627.  Specification of Letters Patent.  Patented July 13, 1909.

Application filed June 13, 1906. Serial No. 321,538.

*To all whom it may concern:*

Be it known that I, FRANK O. YORK, a citizen of the United States, residing at Lock Haven, in the county of Clinton and State of Pennsylvania, have invented a new and useful Hame-Fastener, of which the following is a specification.

This invention relates to improvements in devices for fastening the ends of hames, and has for its object to improve the construction and increase the efficiency of devices of this character.

With these and other objects in view which will appear as the nature of the invention is better understood, the invention consists in certain novel features of construction as hereafter fully described and claimed.

In the accompanying drawings forming a part of this specification and in which corresponding parts are denoted by like designating characters, there is illustrated a preferred form of the invention capable of carrying the same into practical operation, it being understood that various changes in the form, proportion, and minor details of construction may be resorted to without departing from the principle or sacrificing any of the advantages of this invention within the scope of the appended claim.

In the drawings:—Figure 1 is a side elevation of the improved device applied. Figs. 2 and 3 are perspective views of the two main portions of the device, disconnected.

The improved device comprises two bars 10—11 preferably curved, the bar 10 having means such as a hook 12 for engagement with a loop 13 on one hame end 14, and the bar 11 having means such as a hook 15 for engagement with a loop 16 on the other hame end 17.

The bar 10 is provided with a plurality of spaced transverse teeth 18, and the bar 11 is likewise provided with a plurality of spaced transverse teeth 19, the two sets of teeth adapted to be interengaged, as shown in Fig. 1.

One of the bars is provided with a keeper 20 embracing the other bar and long enough to permit the bar 11 to be moved far enough away from the bar 10 to enable the teeth 19 to be separated from the teeth 18 when the bars are to be adjusted longitudinally, as will be obvious.

The bar 11 is provided with a head $21^\times$ of greater width than its toothed portion and through which extends an aperture 22 in which is journaled a roller 21. The head is provided with an inclined face $22^\times$ that constitutes a stop, and is designed to be engaged by the inclined terminal $23^\times$ of the toothed portion of the bar 10, thus to limit the inward movement of the two bars relatively to each other to prevent the terminal of the bar 10 from projecting across the aperture 22, which would prevent the proper action of the tightening strap 23, which is secured to the bar 10 by screws or rivets 24. This strap adapted to be passed through the aperture 22 and around the roller 21 and thence between the keeper 20 and the bar embraced thereby, the strap thus serving as a filler member to occupy the surplus space within the keeper 20, and hold the bar 11 with its teeth 19 in engagement with the teeth 18 of the bar 10.

By this simple means the two bars 10—11 may be adjusted longitudinally to any required extent within the range of the teeth 18—19, and firmly locked in the adjusted position by means of the strap 23. The hames may thus be adjusted to any size of collar, or to any size of horse.

Having thus described the invention, what is claimed is:—

A hame fastener comprising a pair of curved bars each provided with teeth that are arranged to interlock and each being furnished with a hame engaging hook, one of the bars being provided intermediate of its ends with a keeper and the other bar having adjacent to the hook, a transversely orificed head of greater width than its toothed portion, a roller arranged within the orifice, and a hame tightening strap secured to the keeper carrying bar and projecting through the orifice and around the roller and through the keeper, the head being provided with an inclined surface extending from the toothed face upwardly and beyond the plane of said teeth and forming a stop to limit the inward movement of the bars relative to each other in order to prevent the terminal of one of the bars from projecting across the aperture in the other bar, thereby to prevent interference with the operation of the tightening of the strap.

In testimony that I claim the foregoing as my own, I have hereto affixed my signature in the presence of two witnesses.

FRANK O. YORK.

Witnesses:
 ISAAC RUMBERGER,
 F. W. FLEMING.